US010556424B2

(12) United States Patent
Zhao

(10) Patent No.: US 10,556,424 B2
(45) Date of Patent: Feb. 11, 2020

(54) APPARATUS AND METHOD FOR DETECTING THE VOLUME OF A LIQUID DROP, AND METHOD FOR ADJUSTING THE VOLUME OF A LIQUID DROP

(71) Applicant: BOE Technology Group Co., Ltd., Beijing (CN)

(72) Inventor: Dejiang Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/751,048

(22) PCT Filed: Aug. 24, 2017

(86) PCT No.: PCT/CN2017/098826
§ 371 (c)(1),
(2) Date: Feb. 7, 2018

(87) PCT Pub. No.: WO2018/137341
PCT Pub. Date: Aug. 2, 2018

(65) Prior Publication Data
US 2019/0389202 A1 Dec. 26, 2019

(30) Foreign Application Priority Data
Jan. 24, 2017 (CN) .......................... 2017 1 0060202

(51) Int. Cl.
*B41J 2/045* (2006.01)
*G01F 19/00* (2006.01)

(52) U.S. Cl.
CPC ....... *B41J 2/04508* (2013.01); *B41J 2/04581* (2013.01); *G01F 19/00* (2013.01)

(58) Field of Classification Search
CPC .... B41J 2/04508; B41J 2/04581; G01F 19/00
See application file for complete search history.

(56) References Cited

U.S. PATENT DOCUMENTS

| 6,561,614 B1 * | 5/2003 | Therien ....................... B41J 2/12 347/19 |
| 2005/0122363 A1 | 6/2005 | Koyama |
| 2008/0278534 A1 | 11/2008 | Kim et al. |

FOREIGN PATENT DOCUMENTS

| CN | 1337572 A | 2/2002 |
| CN | 13375272 A | 2/2002 |

(Continued)

*Primary Examiner* — Bradley W Thies
(74) *Attorney, Agent, or Firm* — Arent Fox LLP; Michael Fainberg

(57) ABSTRACT

An apparatus and method for detecting the volume of a liquid drop, and a method for adjusting the volume of a liquid drop are disclosed, so as to improve the convenience in making adjustment and measurement, and to alleviate a measure error. The detecting apparatus includes at least one measuring unit, where each of the at least one measuring unit includes: a first measurement groove, at least one second measurement groove, and a third measurement groove arranged adjacent to the second measurement groove, where the capacity of the first measurement groove is more than the total capacity of the second measurement grooves, the height of a sidewall of the first measurement groove shared by the second measurement groove arranged adjacent thereto is less than the height of a sidewall of the first measurement groove not shared by the second measurement groove.

19 Claims, 3 Drawing Sheets

(56) References Cited

FOREIGN PATENT DOCUMENTS

| | | | |
|---|---|---|---|
| CN | 1607378 | A | 4/2005 |
| CN | 101301814 | A | 11/2008 |
| CN | 102650542 | A | 8/2012 |
| CN | 103673872 | A | 3/2014 |
| CN | 105459301 | A | 4/2016 |
| CN | 105459601 | A | 4/2016 |
| KR | 20080061776 | A | 3/2008 |
| KR | 20100037914 | A | 4/2010 |

\* cited by examiner

10,556,424 B2

APPARATUS AND METHOD FOR DETECTING THE VOLUME OF A LIQUID DROP, AND METHOD FOR ADJUSTING THE VOLUME OF A LIQUID DROP

This application is a US National Stage of International Application No. PCT/CN2017/098826, filed on Aug. 24, 2017, designating the United States, and claiming the priority to Chinese Patent Application No. 201710060202.9, filed with the Chinese Patent Office on Jan. 24, 2017 and entitled "apparatus and method for detecting the volume of a liquid drop, and method for adjusting the volume of a liquid drop", which is hereby incorporated by reference in its entirety.

FIELD

This disclosure relates to an apparatus and method for detecting the volume of a liquid drop, and method for adjusting the volume of a liquid drop.

BACKGROUND

Generally an inkjet head is a device which ejects ink drops onto desirable positions on a recording medium to form an image. The inkjet head is categorized into two categories dependent upon its inkjet mechanism. The first category relates to a thermal inkjet head which ejects ink drops under an expansive force of gas bubbles thermally produced in the ink. The other category relates to a piezoelectric inkjet head which ejects ink drops under a pressure applied to the ink due to piezoelectric deformation.

Recently, the inkjet head has been applied in the field of imaging, and other fields. For example, a color filter sheet of a Liquid Crystal Display (LCD) has been fabricated using the inkjet head. The color filter sheet has been fabricated through dyeing, pigment dispersing, printing, and electrodeposition. Printing method for fabricating an Organic Light-Emitting Diode (OLED) product has got attention by more and more manufacturers, and has become a key development focus of the respective manufacturers. However there are a high precision required for the position where the device prints, and a high precision required for the volume of ink, and if the precision of the position where the device prints is low, then the ink drops will fail to enter pixels; and if the precision of the volume of the ink is low, then there will be uneven display. In view of this, a precise measurement of the volume of an ink drop is of great importance to a superior product to be manufactured.

At present, there is a big measurement error, and cumbersome calculating process of the volume of an ink drop, in the method for measuring the volume of an ink drop in the existing apparatus.

SUMMARY

Embodiments of this disclosure provide an apparatus and method for detecting the volume of a liquid drop, and method for adjusting the volume of a liquid drop.

In an aspect, an embodiment of this disclosure provides an apparatus for detecting the volume of a liquid drop, the apparatus including: at least one measuring unit, where each of the at least one measuring unit includes: a first measurement groove; at least one second measurement groove arranged adjacent to the first measurement groove; and a third measurement groove arranged adjacent to the second measurement groove, where a capacity of the first measurement groove is more than a total capacity of all second measurement grooves, a height of a sidewall of the first measurement groove shared by the second measurement groove arranged adjacent thereto is less than a height of a sidewall of the first measurement groove not shared by the second measurement groove, a height of a sidewall of the second measurement groove shared by the third measurement groove arranged adjacent thereto is less than a height of a sidewall of the second measurement groove not shared by the third measurement groove and the first measurement groove, and the height of the sidewall of the second measurement groove shared by the third measurement groove arranged adjacent thereto is less than the height of the sidewall of the first measurement groove not shared by the second measurement groove.

For example, the apparatus for detecting the volume of a liquid drop according to the embodiment of this disclosure further includes a detecting component configured to detect whether there is a liquid drop in the first measurement groove, the second measurement groove, and the third measurement groove.

In some optional implementation, a quantity of second measurement grooves is one, and a quantity of third measurement grooves is one; and a height of a first sidewall of the first measurement groove is less than a height of other sidewall of the first measurement groove than the first sidewall, and a height of a second sidewall of the second measurement groove is less than a height of other sidewall of the second measurement groove than the second sidewall, wherein the first sidewall is a sidewall shared by the first measurement groove and the second measurement groove, and the second sidewall is a sidewall shared by the second measurement groove and the third measurement groove.

In some optional implementation, the second measurement groove is an annular groove surrounding the first measurement groove, and the third measurement groove is an annular groove surrounding the second measurement groove.

In some optional implementation, the detecting component is a camera configured to detect whether there is a liquid drop in the second measurement groove and the third measurement groove.

In some optional implementation, the camera is arranged on a sprayer to be tested.

In some optional implementation, the ratio of the capacity of the first measurement groove to the total capacity of all the second measurement grooves adjacent thereto ranges from 100:1 to 1000:1.

In some optional implementation, the ratio of the total capacity of all the second measurement grooves to the total capacity of all the third measurement grooves ranges from 10:1 to 100:1.

In some optional implementation, the capacity of the first measurement groove ranges from 100 pL to 1000 pL, the total capacity of the second measurement grooves ranges from 1 pL to 10 pL, and the total capacity of the third measurement grooves ranges from 0.1 pL to 1 pL.

In some optional implementation, there are a plurality of measuring units corresponding in a one-to-one manner to nozzles of sprayers to be measured.

In some optional implementation, the nozzles of the sprayers to be measured correspond to the first measurement grooves in the measuring units.

In some optional implementation, the ratios of the capacities of the first measurement grooves to the total capacities of all the second measurement grooves adjacent thereto, in the respective measuring units are different; and/or the ratios of the total capacities of all the second measurement grooves to the total capacities of all the third measurement grooves, in the respective measuring units are different.

In some optional implementation, the first measurement groove, the second measurement groove, and the third measurement groove are cuboid measurement grooves.

In some optional implementation, the detecting apparatus further includes: a test substrate on which the measuring unit is arranged, where the test substrate is a glass substrate.

This disclosure further provides a method for detecting the volume of a liquid drop using the detecting apparatus above, the method including: dropping a preset number of liquid drops into the first measurement groove of the measuring unit corresponding to a sprayer to be tested, using the sprayer to be tested; and detecting whether there is a liquid drop in the first measurement groove, the second measurement groove, and the third measurement groove of the measuring unit.

In some optional implementation, the detecting apparatus further includes: a detecting component configured to detect whether there is a liquid drop in the first measurement groove, the second measurement groove, and the third measurement groove of the measuring unit, where operation of detecting whether there is a liquid drop in the first measurement groove, the second measurement groove, and the third measurement groove of the measuring unit is performed by the detecting component.

In another aspect, this disclosure further provides a method for adjusting the volume of a liquid drop using the detecting apparatus above, the method including: dropping a preset number of liquid drops into the first measurement groove of the measuring unit corresponding to a sprayer to be tested, using the sprayer to be tested; detecting whether there is a liquid drop in the first measurement groove, the second measurement groove, and the third measurement groove of the measuring unit; and adjusting the volume of a liquid drop ejected from a nozzle of the sprayer to be tested, according to a detection result until there are liquid drops in the second measurement groove, and no liquid drops in the third measurement groove.

For example, the detecting apparatus further includes: a detecting component configured to detect whether there is a liquid drop in the first measurement groove, the second measurement groove, and the third measurement groove of the measuring unit, where the operation of detecting whether there is a liquid drop in the first measurement groove, the second measurement groove, and the third measurement groove of the measuring unit is performed by the detecting component.

BRIEF DESCRIPTION OF THE DRAWINGS

In order to make the technical solutions according to the embodiments of this disclosure more apparent, the drawings in the embodiments will be introduced below in brief, and apparently the drawings to be described below are merely illustrative of some embodiments of this disclosure, but not intended to limit this disclosure thereto.

DETAILED DESCRIPTION OF THE EMBODIMENTS

The technical solutions according to the embodiments of this disclosure will be described below clearly and fully with reference to the drawings in the embodiments of this disclosure, and apparently the described embodiments are only a part but all of the embodiments of this disclosure. Based upon the embodiments here of this disclosure, all of other embodiments derived by those ordinarily skilled in the art without any inventive effort shall come into the scope of this disclosure as claimed.

Unless defined otherwise, technical terms or scientific terms throughout this disclosure shall convey their usual meaning as appreciated by those ordinarily skilled in the art to which this disclosure pertains. The term "first", "second", or the like throughout this disclosure does not suggest any order, number or significance, but is only intended to distinguish different components from each other. The term "include", "comprise", or the like refers to that an element or an item preceding to the term encompasses an element(s) or an item(s) succeeding to the term, and its (or their) equivalence(s), but shall not preclude another element(s) or item(s). The term "connect", "connected", or the like does not suggest physical or mechanical connection, but may include electrical connection no matter whether it is direct or indirect. The term "above", "below", "left", "right", etc., is only intended to represent a relative positional relationship, and when the absolute position of an object as described is changed, the relative positional relationship may also be changed accordingly.

This disclosure provides an apparatus for detecting the volume of a liquid drop, where the apparatus includes at least one measuring unit, where each of the at least one measuring unit includes: a first measurement groove; at least one second measurement groove arranged adjacent to the first measurement groove; and a third measurement groove arranged adjacent to the second measurement groove; where the capacity of the first measurement groove is more than the total capacity of all the second measurement grooves, the height of a sidewall of the first measurement groove shared by the second measurement groove arranged adjacent thereto is less than the height of a sidewall of the first measurement groove not shared by the second measurement groove, the height of a sidewall of the second measurement groove shared by the third measurement groove arranged adjacent thereto is less than the height of a sidewall of the second measurement groove not shared by the third measurement groove and the first measurement groove, and the height of the sidewall of the second measurement groove shared by the third measurement groove arranged adjacent thereto is less than the height of the sidewall of the first measurement groove not shared by the second measurement groove.

Figure 1:
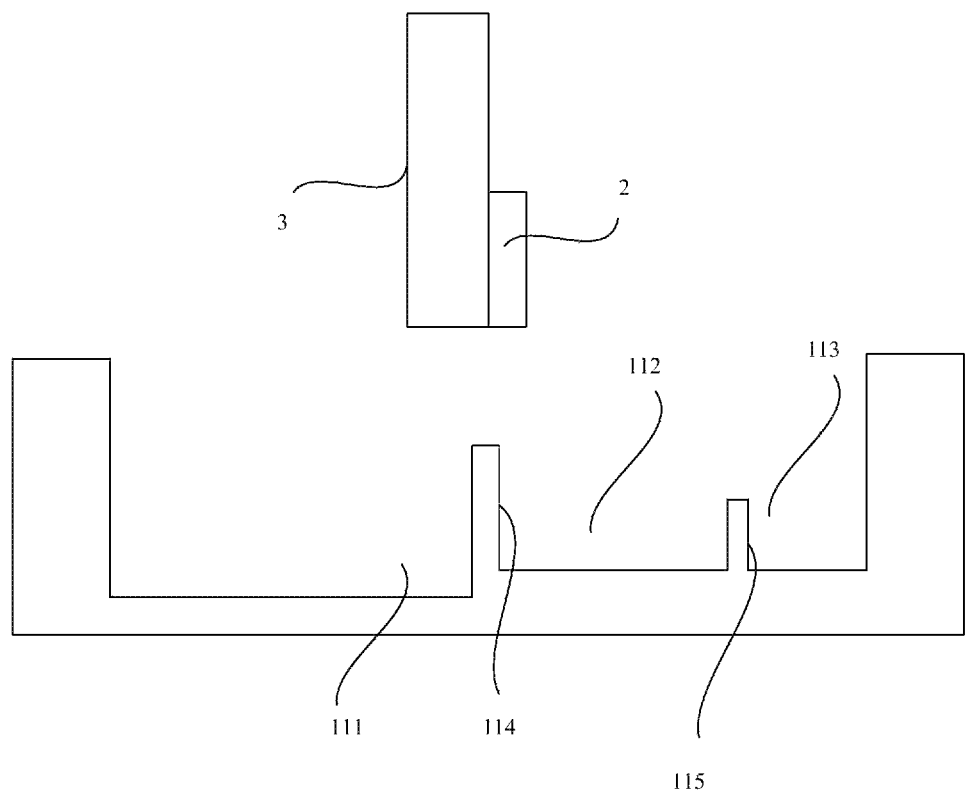
FIG. 1 is a schematic structural diagram of an apparatus for detecting the volume of a liquid drop according to an embodiment of this disclosure.
Figure 2:
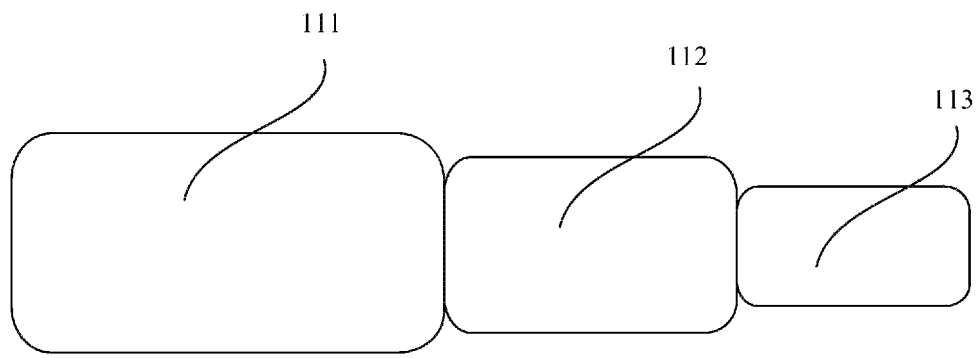
FIG. 2 is a first schematic structural diagram of a measuring unit according to an embodiment of this disclosure.
Figure 3:
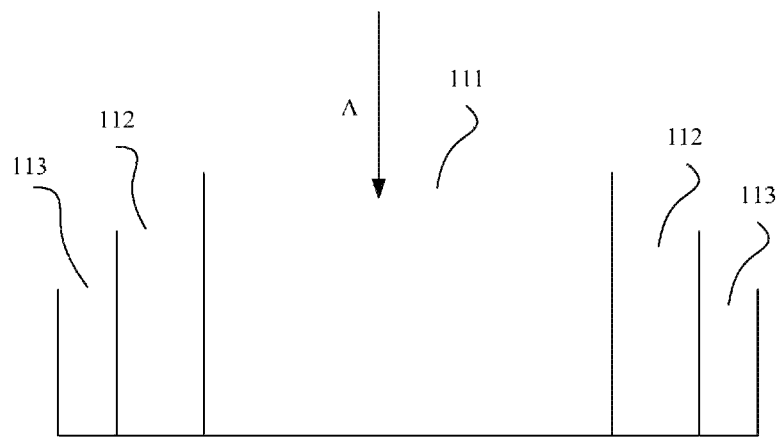
FIG. 3 is a second schematic structural diagram of a measuring unit according to an embodiment of this disclosure.
Figure 4:
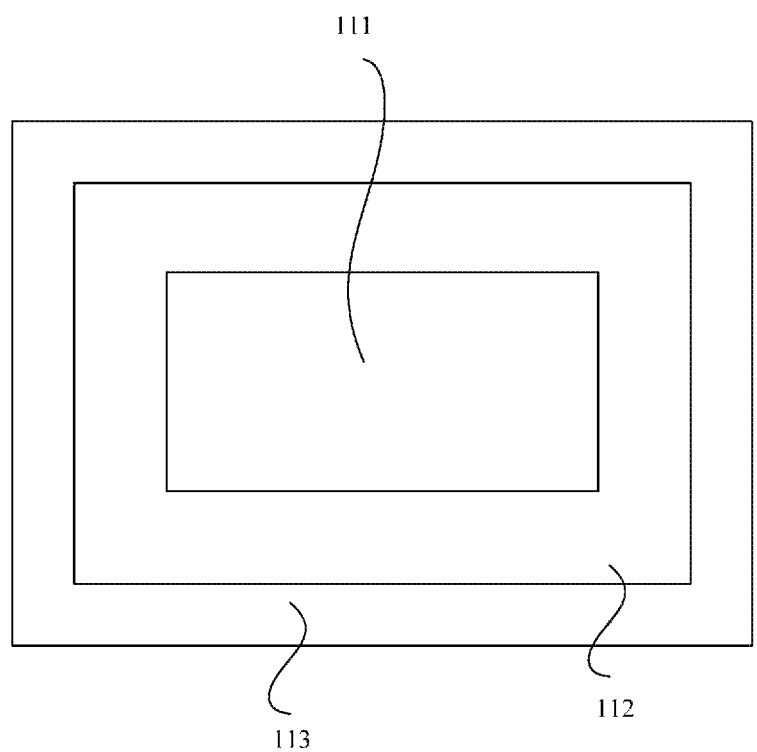
FIG. 4 is a schematic structural diagram of the measuring unit according to the embodiment of this disclosure as illustrated in FIG. 3 in the direction "A".
Figure 5:
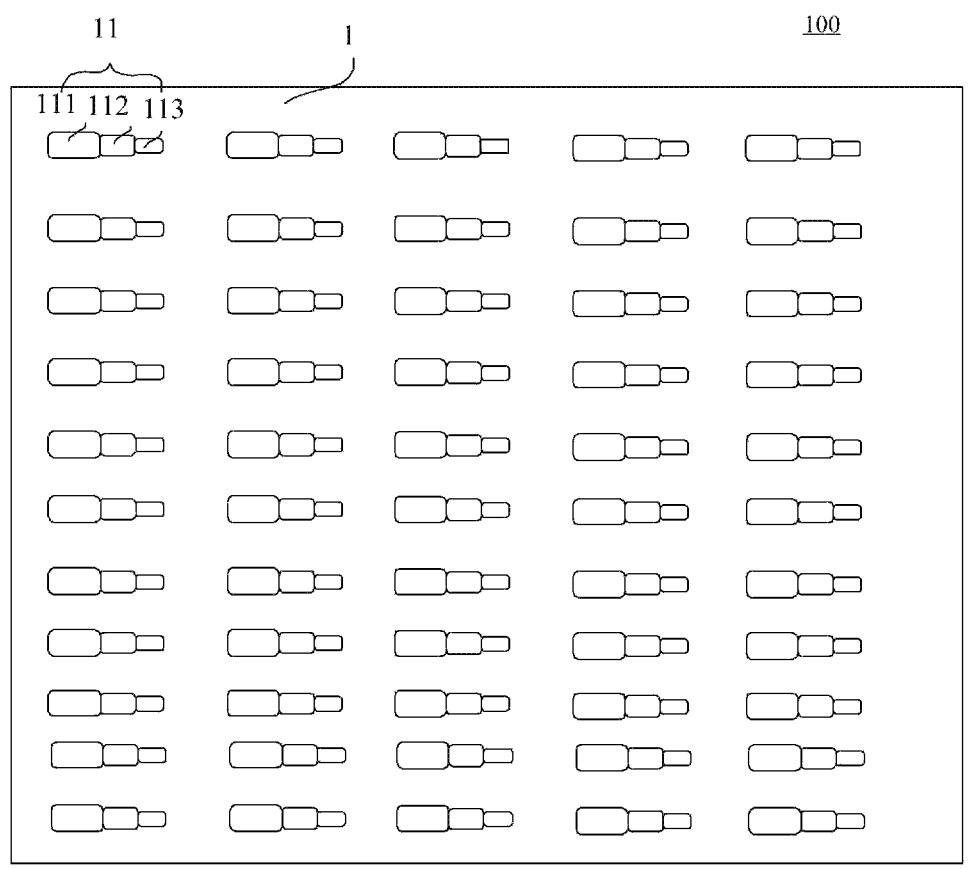
FIG. 5 is a schematic structural diagram of a measurement substrate according to an embodiment of this disclosure.

As illustrated in FIG. 1, FIG. 2, FIG. 3, FIG. 4, and FIG. 5, FIG. 1 is a schematic structural diagram of an apparatus for detecting the volume of a liquid drop according to an embodiment of this disclosure; FIG. 2 is a schematic structural diagram of a measuring unit according to an embodiment of this disclosure; FIG. 3 is a second schematic structural diagram of a measuring unit according to an embodiment of this disclosure; FIG. 4 is a schematic structural diagram of the measuring unit according to the embodiment of this disclosure as illustrated in FIG. 3 in the direction "A"; and FIG. 5 is a schematic structural diagram of a measurement substrate according to an embodiment of this disclosure.

This disclosure provides an apparatus 100 for detecting the volume of a liquid drop, where the apparatus includes: a measurement substrate 1, and at least one measuring unit 11 arranged on the measurement substrate. Each measuring unit 11 includes: a first measurement groove 111; at least one second measurement groove 112 arranged adjacent to the first measurement groove 111; and a third measurement groove 113 arranged corresponding in a one-to-one manner and adjacent to the second measurement groove 112, where the capacity of the first measurement groove 111 is more than the total capacity of the second measurement grooves 112, the height of a sidewall of the first measurement groove 111 shared by the second measurement groove 112 arranged adjacent thereto is less than the height of a sidewall of the first measurement groove 111 not shared by the second measurement groove 112; the total capacity of the third measurement grooves 113 is less than the total capacity of the second measurement grooves 112, and the height of a sidewall of the second measurement groove 112 shared by the third measurement groove 113 arranged adjacent thereto is less than the height of a sidewall of the second measurement groove 112 not shared by the third measurement groove 113 and the first measurement groove 111.

For example, the detecting apparatus 100 can further include a detecting component 2 configured to detect whether there is a liquid drop in the first measurement groove 111, the second measurement groove 112, and the third measurement groove 113.

The apparatus for detecting the volume of a liquid drop according to this disclosure in operation can estimate the volume of a liquid drop according to the capacities of the first measurement groove 111, the second measurement groove 112, and the third measurement groove 113. In operation, a corresponding number of liquid drops are dropped into the first measurement groove 111 according to the capacity of the first measurement groove 111, and the detecting component 2 detects whether there are liquid drops overflowing from the first measurement groove 111 into the second measurement groove 112, whether there are liquid drops overflowing from the second measurement groove 112 into the third measurement groove, to thereby estimate a range of the error between a real volume of a liquid drop, and a theoretical volume thereof. If there are liquid drops in the second measurement groove 112, and no liquid drops in the third measurement groove 113, then it will indicate that the error between the real volume of a liquid drop, and the theoretical volume thereof is relatively small, and the size of a liquid drop ejected from a nozzle 3 does not need to be adjusted. If there are liquid drops in both the second measurement groove 112 and the third measurement groove 113, then it will indicate that the error the error between the real volume of a liquid drop, and the theoretical volume thereof is relatively large, and the size of a liquid drop ejected from the nozzle 3 needs to be adjusted; and after the size of a liquid drop is adjusted, the measurement is made again until there are liquid drops in the second measurement groove 112, and no liquid drops in the third measurement groove 113. The height of the sidewall of the first measurement groove 111 shared by the second measurement groove 112 arranged adjacent thereto is set less than the height of the sidewall of the first measurement groove 111 not shared by the second measurement groove 112, and the height of the sidewall of the second measurement groove 112 shared by the third measurement groove 113 arranged adjacent thereto is set less than the height of the sidewall of the second measurement groove 112 not shared by the third measurement groove 113, to thereby facilitate flowing of the liquid drops into the second measurement groove 112.

Accordingly the apparatus for detecting the volume of a liquid drop according to this disclosure can improve the convenience in making measurement and adjustment, and alleviate a measurement error.

The apparatus above for detecting the volume of a liquid drop can be configured to adjust the volume of a print ink drop from a sprayer of an inkjet printer, to improve the precision of the volume of ink, and to improve the uniformity of displaying on a display device so as to improve a display effect on the display device.

There may be a number of particular structures of the measuring unit above, that is, the number of second measurement grooves 112 may be one, two, or more, and also there may be a number of shapes of the second measurement groove 112 and the third measurement groove 113.

In a particular implementation according to this disclosure, as illustrated in FIG. 1 and FIG. 2, the number of second measurement grooves 112 is one, and the number of third measurement grooves 113 is one; and the height of a first sidewall 114 of the first measurement groove 111 is less than the height of the other sidewall of the first measurement groove 111 than the first sidewall 114, and the height of a second sidewall 115 of the second measurement groove 112 is less than the height of the other sidewall of the second measurement groove 112 than the second sidewall 115, where the first sidewall 114 is the sidewall shared by the first measurement groove 111 and the second measurement groove 112, and the second sidewall 115 is the sidewall shared by the second measurement groove 112 and the third measurement groove 113.

In the measuring unit in operation, the capacity of the first measurement groove 111 can be set to 1000 pL, the capacity of the second measurement groove 112 can be set to 10 pL, and the capacity of the third measurement groove 113 can be set to 1 pL. A test can be made using a nozzle of 10 pL, 100 liquid drops can be dropped into the first measurement groove 111, and the heights of liquid surfaces in the second measurement groove 112 and the third measurement groove 113 can be detected using the detecting component 2. If there are no liquid drops in the second measurement groove 112, then it will indicate that there is a small volume of a liquid drop ejected from the nozzle, and the volume of the liquid drops needs to be increased; if there are liquid drops in the second measurement groove 112, and no liquid drops in the third measurement groove 113, then it will indicate that the error between a real volume of a liquid drop, and a theoretical volume thereof is more than 0, and less than or equal to 1%, and the volume of a liquid drop ejected from the nozzle 3 does not need to be adjusted, and if there are liquid drops in the third measurement groove 113, then it will indicate that the error between the real volume of a liquid drop, and the theoretical volume thereof is more than 1%, and the volume of a liquid drop ejected from the nozzle 3 needs to be adjusted.

In another particular implementation of this disclosure, as illustrated in FIG. 3 and FIG. 4, the second measurement groove 112 is an annular groove surrounding the entire first measurement groove 111, and the third measurement groove 113 is an annular groove surrounding the entire second measurement groove 112. The liquid overflowing out of the first measurement groove can flow to the second measurement groove 112 from the respective sidewalls, and alike the liquid overflowing out of the second measurement groove can flow to the third measurement groove 113 from the respective sidewalls.

For example, the second measurement groove 112 can surround a part of the first measurement groove 111, and the third measurement groove 113 can surround a part of the second measurement groove 112.

There may be a number of particular structures of the detecting unit above, and optionally the detecting component can be a camera, e.g., a CCD camera or a CMOS camera. The camera can be configured to detect whether there are liquid drops in the second measurement groove 112 and the third measurement groove 113.

Optionally the camera is arranged on the nozzle to be tested. Of course, the CCD camera can alternatively be arranged at another position, e.g., the sidewall of the second measurement groove and the third measurement groove, and preferably the outside of the CCD camera can be wrapped with a waterproof seal enclosure to thereby improve a service lifetime of the CCD camera.

In an optional implementation, the ratio of the capacity of the first measurement groove 111 to the total capacity of all the second measurement grooves 112 adjacent thereto ranges from 100:1 to 1000:1, and the total capacity of all the second measurement grooves 112 to the total capacity of all the third measurement grooves 113 ranges from 10:1 to 100:1. For example, the ratio of the capacity of the first measurement groove 111 to the total capacity of all the second measurement grooves 112 adjacent thereto can be 102:1, 200:1, 300:1, 500:1, 700:1, 900:1, 1000:1, etc., although a repeated description thereof will be omitted here; and the total capacity of all the second measurement grooves 112 to the total capacity of all the third measurement grooves 113 is 10:1, 20:1, 31:1, 41:3, 50:1, 60:1, 100:1, etc., although a repeated description thereof will be omitted here.

The particular capacities of the first measurement groove 111, the second measurement groove 112, and the third measurement groove 113 can be set as needed in reality; and optionally the capacity of the first measurement groove 111 ranges from 100 pL to 1000 pL, the total capacity of the second measurement grooves 112 ranges from 1 pL to 10 pL, and the total capacity of the third measurement grooves 113 ranges from 0.1 pL to 1 pL.

As illustrated in FIG. 3, in order to improve the measurement efficiency of the measurement substrate 1, and to improve the utility of the measurement substrate 1, there are a plurality of measuring units 11, corresponding in a one-to-one manner to nozzles 3 of sprayers to be measured, arranged on the measurement substrate 1.

In order to enable the sprayers with different theoretical volumes to be measured by the measurement substrate 1, the ratios of the capacities of the first measurement grooves 111 to the total capacities of all the second measurement grooves 112 adjacent thereto in the respective measuring units 11, or a part thereof are different; and/or the ratios of the total capacities of all the second measurement grooves 112 to the total capacities of all the third measurement grooves 113 in the respective measuring units 11, or a part thereof are different, that is, there may be the same ratios of the capacities of the first measurement grooves 111 to the total capacities of all the second measurement grooves 112 adjacent thereto, and the same ratios of the total capacities of all the second measurement grooves 112 to the total capacities of all the third measurement grooves 113, in the respective measuring units 11 on the same substrate; or there may be the same ratios of the capacities of the first measurement grooves 111 to the total capacities of all the second measurement grooves 112 adjacent thereto, and different ratios of the total capacities of all the second measurement grooves 112 to the total capacities of all the third measurement grooves 113, in the respective measuring units 11; or there may be different ratios of the capacities of the first measurement grooves 111 to the total capacities of all the second measurement grooves 112 adjacent thereto, and the same ratios of the total capacities of all the second measurement grooves 112 to the total capacities of all the third measurement grooves 113, in the respective measuring units 11.

There may be a number of particular shapes of the first measurement groove 111, the second measurement groove 112, and the third measurement groove 113, and optionally the first measurement groove 111, the second measurement groove 112, and the third measurement groove 113 are cuboid measurement grooves. Of course, the shapes of the first measurement groove 111, the second measurement groove 112, and the third measurement groove 113 may be the same, or may be different.

The test substrate above is a glass substrate, or of course, can alternatively be made of a silicon material, or a hydrophobic material.

This disclosure further provides a method for detecting the volume of a liquid drop using the detecting apparatus above, where the method includes:

dropping, by using a sprayer to be tested, a preset number of liquid drops into the first measurement groove of the measuring unit corresponding to the sprayer to be tested; and detecting whether there is a liquid drop in the first measurement groove, the second measurement groove, and the third measurement groove of the measuring unit.

For example, the detecting apparatus further includes:

a detecting component configured to detect whether there is a liquid drop in the first measurement groove, the second measurement groove, and the third measurement groove, where the operation of detecting whether there is a liquid drop in the first measurement groove, the second measurement groove, and the third measurement groove of the measuring unit is performed by the detecting component.

This disclosure further provides a method for measuring the volume of a liquid drop using the detecting apparatus above, where the method includes:

dropping a preset number of liquid drops, for example, consecutively, into the first measurement groove 111 of the measuring unit corresponding to a sprayer to be tested, using the sprayer to be tested;

detecting whether there is a liquid drop in the first measurement groove 111, the second measurement groove 112, and the third measurement groove 113 of the measuring unit; and adjusting the volume of a liquid drop ejected from a nozzle 3 of the sprayer to be tested, according to a detection result until there are liquid drops in the second measurement groove 112, and no liquid drops in the third measurement groove 113.

For example, the detecting apparatus further includes a detecting component 2 configured to detect whether there is a liquid drop in the first measurement groove, the second measurement groove, and the third measurement groove of the measuring unit, where the operation of detecting whether there is a liquid drop in the first measurement groove, the second measurement groove, and the third measurement groove of the measuring unit is performed by the detecting component.

For example, after the volume of a liquid drop is detected or adjusted using the measuring unit, the liquid drops in the measuring unit can be cleared by first cleaning the measurement unit using solvent, and then drying it.

Particularly the capacity of the first measurement groove 111 can be set to 1000 pL, the capacity of the second measurement groove 112 can be 10 pL, and the capacity of the third measurement groove 113 can be 1 pL. A test is made on a sprayer of 10 pL, 100 liquid drops are dropped into the first measurement groove 111, and the second measurement groove 112 and the third measurement groove 113 are detected using the detecting component 2 for liquid drops. If there are no liquid drops in the second measurement groove 112, then it will indicate that there is a small volume of a liquid drop ejected from the nozzle 3, and the volume of a liquid drop needs to be increased; if there are liquid drops in the second measurement groove 112, and no liquid drops in the third measurement groove 113, then it will indicate that the error between a real volume of a liquid drop, and a theoretical volume thereof is more than 0, and less than or equal to 1%, and the volume of a liquid drop ejected from the nozzle 3 does not need to be adjusted; and if there are liquid drops in the third measurement groove 113, then it will indicate that the error between a real volume of a liquid drop, and a theoretical volume thereof is more than 1%, and the volume of a liquid drop ejected from the nozzle 3 needs to be adjusted.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An apparatus for detecting a volume of a liquid drop, comprising:
    at least one measuring unit, wherein each of the at least one measuring unit comprises:
    a first measurement groove;
    at least one second measurement groove arranged adjacent to the first measurement groove; and
    a third measurement groove arranged adjacent to the second measurement groove,
    wherein a capacity of the first measurement groove is more than a total capacity of all second measurement grooves, a height of a sidewall of the first measurement groove shared by the second measurement groove arranged adjacent thereto is less than a height of a sidewall of the first measurement groove not shared by the second measurement groove, a height of a sidewall of the second measurement groove shared by the third measurement groove arranged adjacent thereto is less than a height of a sidewall of the second measurement groove not shared by the third measurement groove and the first measurement groove, and the height of the sidewall of the second measurement groove shared by the third measurement groove arranged adjacent thereto is less than the height of the sidewall of the first measurement groove not shared by the second measurement groove.

2. The apparatus for detecting the volume of a liquid drop according to claim 1, wherein the detecting apparatus further comprises:
    a detecting component configured to detect whether there is a liquid drop in the first measurement groove, the second measurement groove, and the third measurement groove.

3. The apparatus for detecting the volume of a liquid drop according to claim 2, wherein the detecting component is a camera.

4. The apparatus for detecting the volume of a liquid drop according to claim 3, wherein the camera is arranged on a sprayer to be tested.

5. The apparatus for detecting the volume of a liquid drop according to claim 1, wherein a quantity of second measurement grooves is one, and a quantity of third measurement grooves is one; and a height of a first sidewall of the first measurement groove is less than a height of other sidewall of the first measurement groove than the first sidewall, and a height of a second sidewall of the second measurement groove is less than a height of other sidewall of the second measurement groove than the second sidewall, wherein the first sidewall is a sidewall shared by the first measurement groove and the second measurement groove, and the second sidewall is a sidewall shared by the second measurement groove and the third measurement groove.

6. The apparatus for detecting the volume of a liquid drop according to claim 1, wherein the second measurement groove is an annular groove surrounding the first measurement groove, and the third measurement groove is an annular groove surrounding the second measurement groove.

7. The apparatus for detecting the volume of a liquid drop according to claim 1, wherein a ratio of the capacity of the first measurement groove to the total capacity of all the second measurement grooves adjacent thereto ranges from 100:1 to 1000:1.

8. The apparatus for detecting the volume of a liquid drop according to claim 7, wherein the capacity of the first measurement groove ranges from 100 pL to 1000 pL, the total capacity of the second measurement grooves ranges from 1 pL to 10 pL, and the total capacity of the third measurement grooves ranges from 0.1 pL to 1 pL.

9. The apparatus for detecting the volume of a liquid drop according to claim 1, wherein a ratio of the total capacity of all the second measurement grooves to the total capacity of all the third measurement grooves ranges from 10:1 to 100:1.

10. The apparatus for detecting the volume of a liquid drop according to claim 9, wherein the capacity of the first measurement groove ranges from 100 pL to 1000 pL, the total capacity of the second measurement grooves ranges from 1 pL to 10 pL, and the total capacity of the third measurement grooves ranges from 0.1 pL to 1 pL.

11. The apparatus for detecting the volume of a liquid drop according to claim 1, wherein there are a plurality of measuring units corresponding in a one-to-one manner to nozzles of sprayers to be measured.

12. The apparatus for detecting the volume of a liquid drop according to claim 11, wherein the nozzles of the sprayers to be measured correspond to the first measurement grooves in the measuring units.

13. The apparatus for detecting the volume of a liquid drop according to claim 12, wherein ratios of the capacities of the first measurement grooves to the total capacities of all the second measurement grooves adjacent thereto, in the respective measuring units are different; and/or ratios of the total capacities of all the second measurement grooves to the total capacities of all the third measurement grooves, in the respective measuring units are different.

14. The apparatus for detecting the volume of a liquid drop according to claim 1, wherein the first measurement groove, the second measurement groove, and the third measurement groove are cuboid measurement grooves.

15. The apparatus for detecting the volume of a liquid drop according to claim 1, wherein the detecting apparatus further comprises:
a test substrate on which the measuring unit is arranged, wherein the test substrate is a glass substrate.

16. A method for detecting the volume of a liquid drop, using the apparatus for detecting the volume of a liquid drop according to claim 1, the method comprising:
dropping a preset number of liquid drops into the first measurement groove of the measuring unit corresponding to a sprayer to be tested, using the sprayer to be tested; and
detecting whether there is liquid drop in the first measurement groove, the second measurement groove, and the third measurement groove of the measuring unit.

17. The method for detecting the volume of a liquid drop according to claim 16, wherein the detecting apparatus further comprises:
a detecting component configured to detect whether there is a liquid drop in the first measurement groove, the second measurement groove, and the third measurement groove of the measuring unit,
wherein operation of detecting whether there is liquid drop in the first measurement groove, the second measurement groove, and the third measurement groove of the measuring unit is performed by the detecting component.

18. A method for adjusting the volume of a liquid drop using the apparatus for detecting the volume of a liquid drop according to claim 1, the method comprising:
dropping a preset number of liquid drops into the first measurement groove of the measuring unit corresponding to a sprayer to be tested, using the sprayer to be tested;
detecting whether there is a liquid drop in the first measurement groove, the second measurement groove, and the third measurement groove of the measuring unit; and
adjusting the volume of a liquid drop ejected from a nozzle of the sprayer to be tested, according to a detection result until there are liquid drops in the second measurement groove, and no liquid drops in the third measurement groove.

19. The method for detecting the volume of a liquid drop according to claim 18, wherein the detecting apparatus further comprises:
a detecting component configured to detect whether there is a liquid drop in the first measurement groove, the second measurement groove, and the third measurement groove of the measuring unit,
wherein operation of detecting whether there is liquid drop in the first measurement groove, the second measurement groove, and the third measurement groove of the measuring unit is performed by the detecting component.

* * * * *